Aug. 16, 1966　　　　J. M. LEACH　　　　3,266,621

MATERIAL HANDLING CONVEYOR

Filed Oct. 15, 1964　　　　　　　　　　4 Sheets-Sheet 1

INVENTOR.

John M. Leach

Aug. 16, 1966     J. M. LEACH     3,266,621
MATERIAL HANDLING CONVEYOR
Filed Oct. 15, 1964     4 Sheets-Sheet 2

INVENTOR.
John M. Leach

Aug. 16, 1966 J. M. LEACH 3,266,621
MATERIAL HANDLING CONVEYOR
Filed Oct. 15, 1964 4 Sheets-Sheet 3
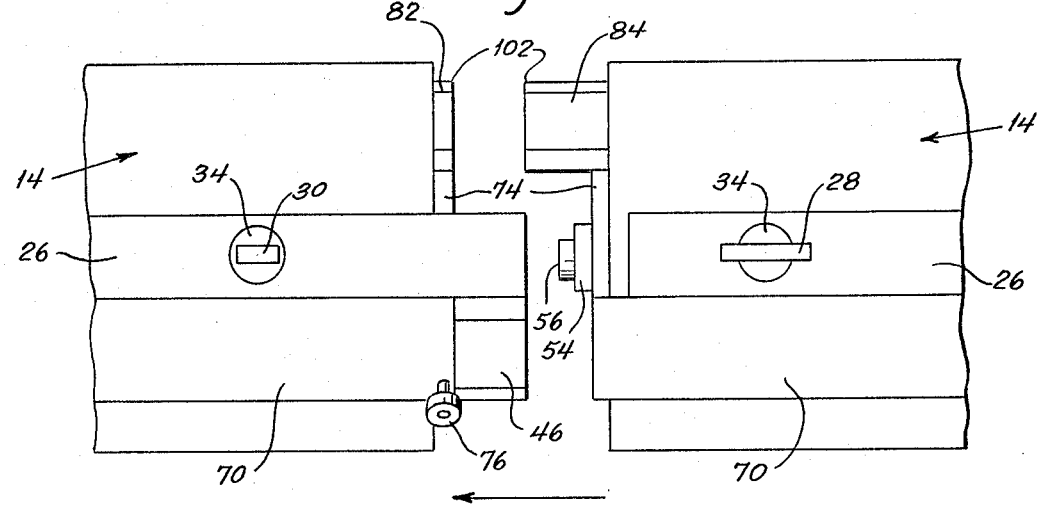
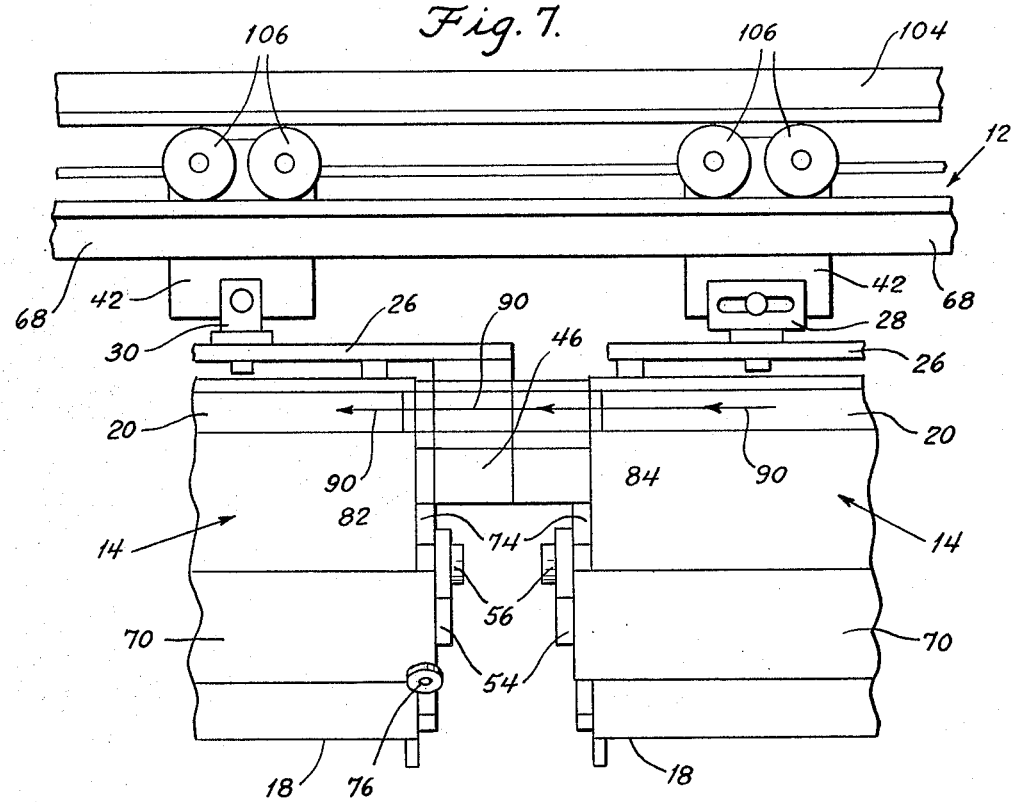
INVENTOR.
John M. Leach Aug. 16, 1966 J. M. LEACH 3,266,621
MATERIAL HANDLING CONVEYOR
Filed Oct. 15, 1964 4 Sheets-Sheet 4

INVENTOR.
John M. Leach 3,266,621
MATERIAL HANDLING CONVEYOR
John M. Leach, P.O. Box 350, Port Jefferson, N.Y.
Filed Oct. 15, 1964, Ser. No. 404,078
19 Claims. (Cl. 198—177)

The present invention relates to conveyors. More particularly it relates to conveyors for carrying bulk and semi-liquid materials which can not be effectively pumped in a practical manner.

There are numerous bulk, semi-liquid and semi-solid materials which should be carried in a completely closed conveyor for many reasons, among which are dusting, hygroscopicity, emission of odors, tendency to absorb odors, prevent outside contamination, toxicity, adversely affected by light, require close temperature control, prevent escape of volatiles and require controlled atmospheric characteristics.

In addition, many of these same materials can not be successfully carried by any conveyor which exerts frictional or pressure forces upon them because of extreme fluidity, abrasiveness or fragility.

Many attempts have been made heretofore to convey such materials in a series of separated containers or overlapped containers or in a longitudinally moving tube. The separated containers have presented a serious filling problem and the overlapped containers have proved difficult to move around turns and both types have been restricted to operation in one plane. The moving tube has presented serious filling and discharging problems, has proved very difficult to drive effectively, has been extremely costly and had a very short wear life.

It is an object of the present invention to provide a completely closed conveyor which will carry any material which can be poured from one level to another in absolute isolation, without exerting any frictional forces upon the material and without exerting any pressure upon the material over and above the internal pressure created by the weight of the material.

It is another object of the present invention to provide a conveyor which will carry any material which can be poured from one level to another without exerting any frictional forces upon the material and move in any direction in any plane desired.

It is a further object of the present invention to provide a conveyor which will carry any material which can be poured from one level to another without exerting any frictional forces upon the material and which can be charged with a continuous stream of the material without spillage of the material.

It is a still further object of the present invention to provide a conveyor which will carry any material which can be poured from one level to another in large quantities without exerting any frictional forces upon the material, move in any direction in any plane desired and still make relatively sharp turns.

It is still another object of the present invention to provide a conveyor which will carry any material which can be poured from one level to another without exerting any frictional forces upon the material and move in any direction in any plane desired including vertically over long distances without allowing any fall-back or run down of the material and without compacting the material on the vertical run.

It is a still further object of the present invention to provide a conveyor which will carry any material which can be poured from one level to another without exerting any frictional forces upon the material and without causing any degradation or separation of particle sizes within the material.

Other objects and advantages of the present invention will become apparent to those skilled in the art upon recourse to the following specification and drawings which illustrate what is now considered to be the preferred embodiment of the invention.

In the drawings:

FIG. 6 is a top view of two material magazines with the filling and discharge opening closures shown in closed position;

FIG. 7 is a side view of two material magazines with the filling and discharge opening closures shown in open position;

The conveyor of the present invention comprises essentially a series of material carrying magazines supported by an endless trolley type of conveyor with the magazines separated by a suitable space so as to be capable of making both vertical and horizontal turns without mutual interference except at the load point or points at which the magazines are temporarily interconnected to prevent any spill-through of the material being loaded between the magazines. Any type of endless trolley or similar conveyor can be used to suitably support the magazines but the conveyor disclosed in U.S. Patents Nos. 2,808,146 and 2,884,116 are preferred for reasons which will be later pointed out.

Figure 1:
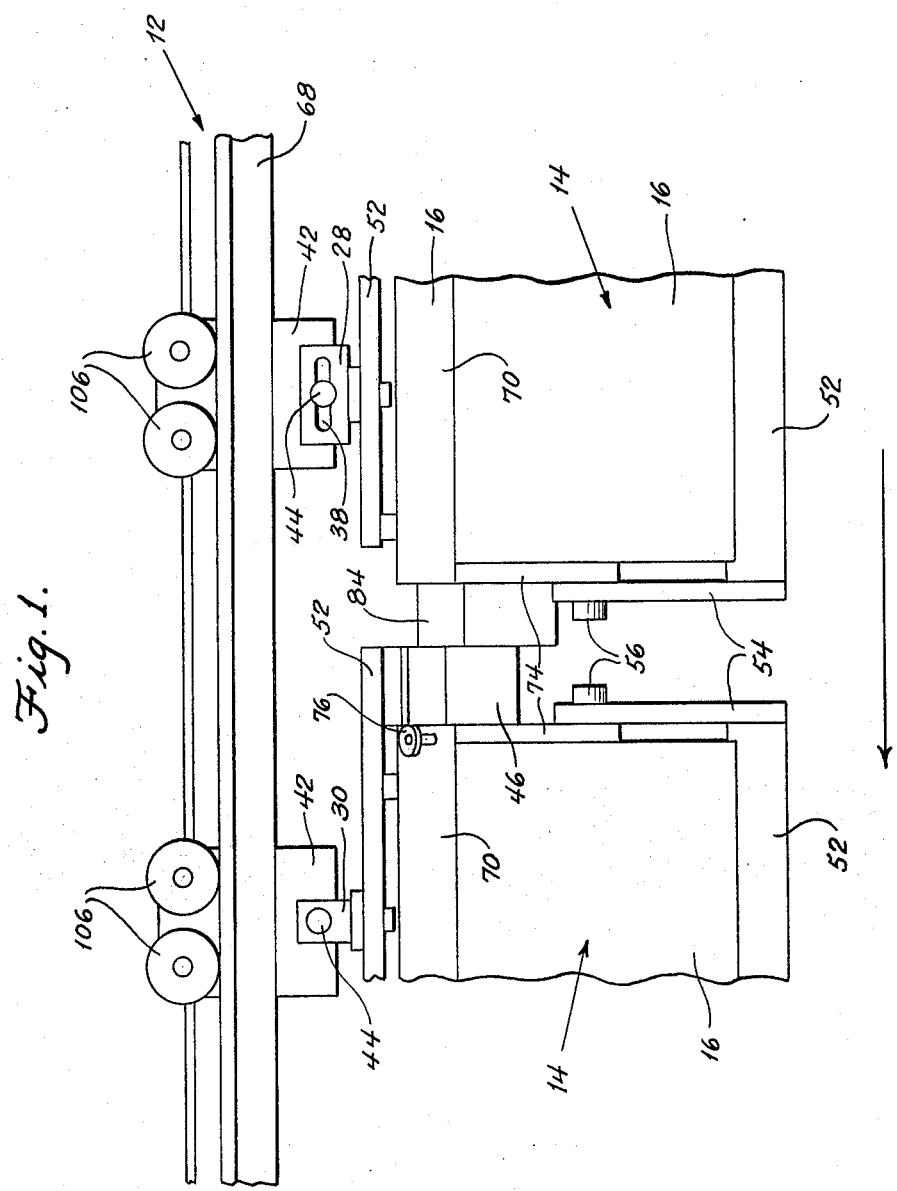
FIG. 1 is a side view of the conveyor of the present invention showing the filling and discharge opening closures both in closed position.

Referring to FIG. 1, the endless trolley conveyor is shown at 12 and a portion of each of two magazines are shown at 14. Only a portion of the trolley conveyor is shown but it is to be understood that this conveyor is endless, can travel in any desired direction and at any angle desired including horizontally, vertically up and down and at any desired angle. It is driven by a powered drive which within itself forms no part of the present invention and is not shown and the magazines 14 will normally be in a series which is co-extensive with the trolley conveyor.

Figure 2:
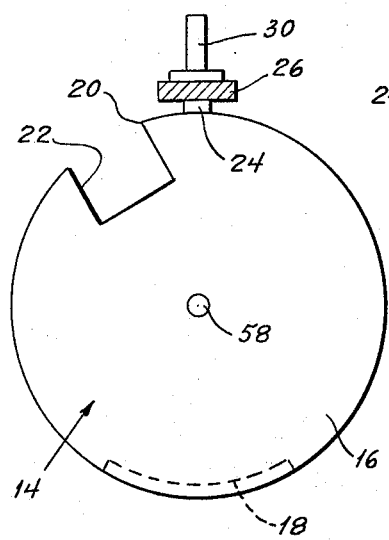
FIG. 2 is an end view of a material magazine of the conveyor of the present invention with a part in section taken on the plane represented by line 2—2 of FIG. 3 and looking in the direction of the arrows.
Figure 3:
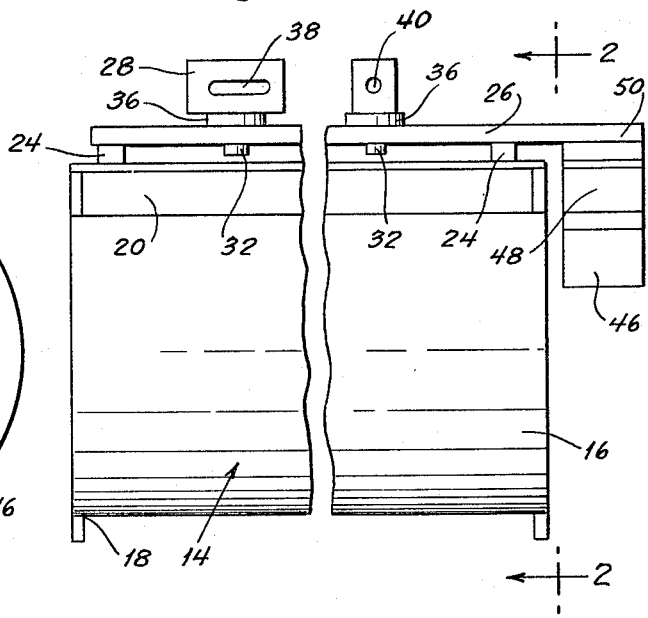
FIG. 3 is a side view of a material magazine of the present invention with the closures removed to better illustrate the basic structure of the magazine.
Figure 4:
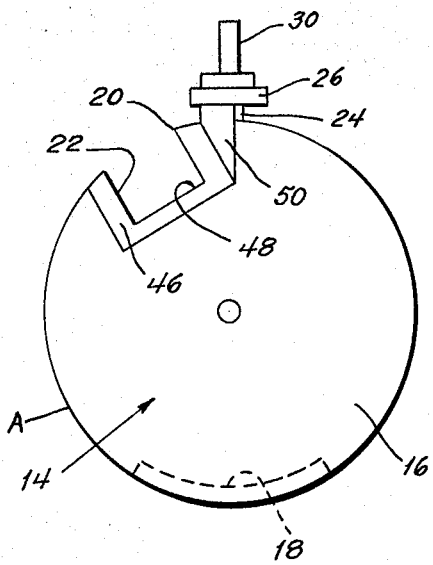
FIG. 4 is a view of the right hand end of the material magazine as seen in FIG. 3.

Each of the magazines 14 comprises a hollow container 16 which is preferably cylindrical in shape to facilitate loading, unloading, cleaning and operation of the movable closures to be later described but other shapes may be used if desired. The magazines 14 are shown in FIGS. 2, 3 and 4 in stripped down condition to better illustrate the basic container structure which preferably comprises a cylindrical body 16 with fixed end closures and provided with two openings extending longitudinally of it. The lower opening 18 is to discharge material and the upper opening 20, see FIG. 3, is to receive material. The opening 20 extends downwardly into each of the end walls as shown at 22.

The container 16 is suitably fastened by spacers 24 to a bar 26 which has two brackets 28 and 30 swively mounted thereon as for example by means of machine screws 32 which extends up through suitable openings in the bar 26 (not shown) and thread into blind openings in the circular bases 36 suitably attached to the brackets. The bracket 28 is provided with a slot 38 and the bracket 30 is provided with an opening 40 through which bolts 44 are passed to attach the magazines to the trolley plates 42 of the endless conveyor 12. The swivel connections enable the brackets to rotate slightly relative to the container 16 and bar 26 when the conveyor is making horizontal turns and the slot 38 enables the trolley plates 42 to move towards and away from each other when the conveyor is making vertical turns either up or down.

A fixed filler block 46 having a channel 48 formed therein which is of the same shape and size and in alignment with the openings 22 in the end walls of cylinder 16 is suitably carried by the bar 26 as by the bracket 50.

Figure 5:
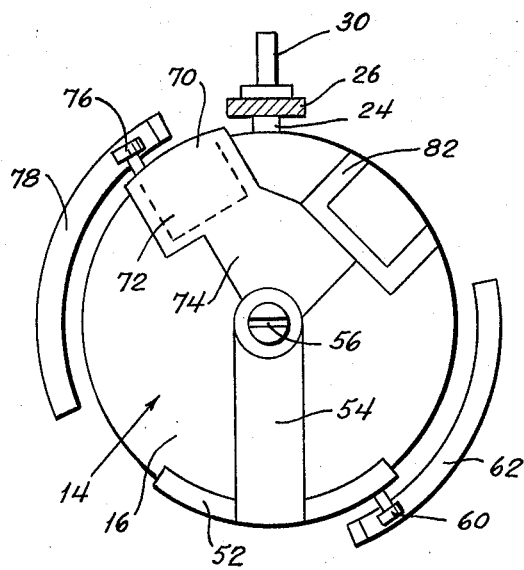
FIG. 5 is an end view of the material magazine with the same part in section as in FIG. 2 but with the filling and discharge opening closures shown in closed position.
Figure 8:
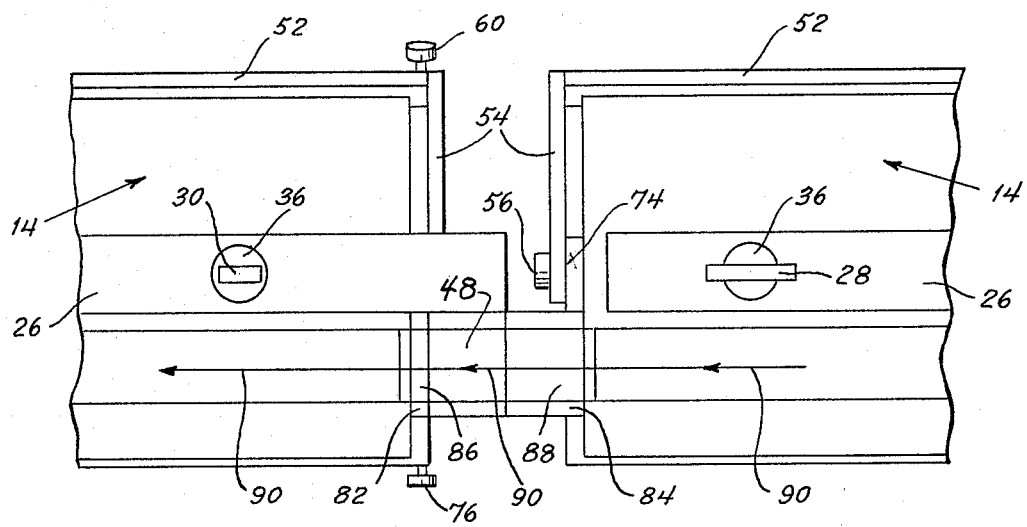
FIG. 8 is a top view of two material magazines with the filling and discharge opening closures shown in open position.
Figure 9:
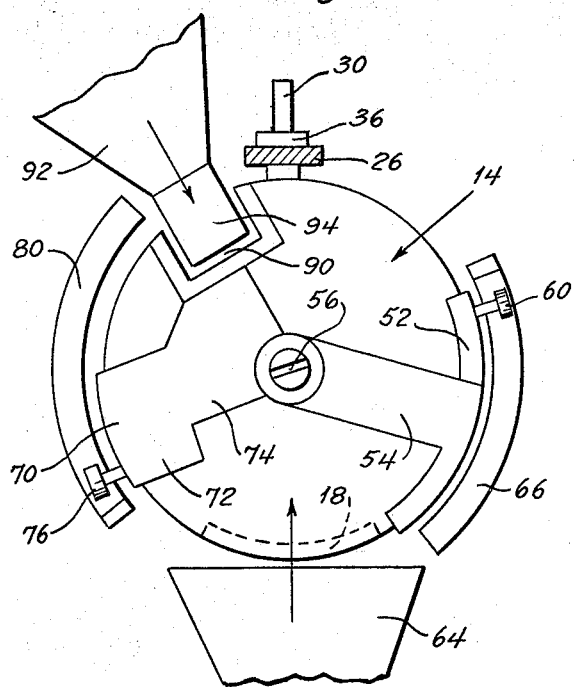
FIG. 9 is an end view of a material magazine with the same part in section as in FIG. 2 and with the filling and discharge opening closures shown in open positions.

A movable closure 52 is shaped on the inside so as to snugly fit the exterior of the container wall 16, see FIGS. 1, 5 and 9, and is supported at each end by an arm 54 which is supported for swinging movement by a headed screw 56 which is threaded into a blind opening 58, see FIG. 2, in an end wall of the container 16. The movable closure 52 is shown in the closed position in FIGS. 1 and 5 and in the open position in FIGS. 7, 8 and 9. The movable closure 52 fits the exterior of the cylindrical container 16 with sufficient tightness to prevent any spillage of material from the magazine 14 when the movable closure is in the closed position.

The movable closure 52 carries a roller 60 which acts as a cam follower and cooperates with a cam bar 62, see FIG. 5, which is suitably supported at the approach to each discharge point so as to be contacted by the roller 60 as the magazine is moved by the endles conveyor, in a direction directly into the paper as viewed in FIG. 5, and move the roller in counter-clockwise rotation and thereby likewise rotate the movable closure 52 to uncover the opening 18 and cause the material to empty out through the opening 18 into any suitable collection vessel 64, see FIG. 9.

As the magazine 14 leaves the discharge point the roller 60 contacts a second cam bar 66, see FIG. 9, which moves the roller 60 and movable closure 52 in clockwise rotation to again close the opening 18 so that the magazine can again be charged with material.

The cam bars 62 and 66 can be supported in any suitable manner but are usually supported by suitable brackets, not shown, from the track 68 of the endless conveyor 12. By making the cam bars 62 and 66 removable, any desired number of discharge points can be provided and selectively activated by merely placing the cam bars in position to move the roller 60, and removing the bars when it is desired to de-activate a discharge point.

A second and independently movable closure 70 is provided for the filling opening 20. This closure 70 is provided at each end with an inwardly extending side wall 72 which in the closed position of the closure 70 tightly covers and closes the side openings 22 in the end walls of the container 16. The side walls 72 are connected to arms 74 which are pivoted for independent rotation on the headed screws or studs 56 adjacent to but independently of the arms 54.

Each filling opening closure 70 carries a roller 76 which cooperates with cam bars 78 and 80 placed at the approach and exit from the filling point to open and close the opening 20, respectively, as each magazine moves into the filling point in the same way as the roller 60 and bars 62 and 66 co-operate to move the closure 52 as explained above. The cam bars 78 and 80 are supported in the same manner as the bars 62 and 66 and can be removed and placed in operative position to selectively activate and de-activate any desired number of filling points in the same manner as explained above in connection with the discharge points. When the bars are in position the respective closure will be be first opened and then closed, and when the bars are not in position the respective closure will remain in whichever position it happens to be at that time.

Each arm 74 at the right hand end of each magazine 14 as viewed in FIG. 7 carries a movable filler block 82 and each arm 74 at the left end of each magazine 15 carries a movable filler block 84. The filler blocks 82 and 84 are provided with channels 86 and 88, respectively, which are of the same shape and area as the channel 48 in the fixed filler block 46. When two adjacent closures 70 are in the open or filling position as seen in FIGS. 7, 8 and 9, the movable filler blocks 82 and 84 are in position in alignment with the fixed filler block 46 so that the channels 48, 86 and 88 and the openings 22 form a continuous channel or trough 90 extending as shown by the arrows from any one magazine into the next magazine when the filling opening closures 70 are in the open position which is always the case at an active filling point.

Figure 10:
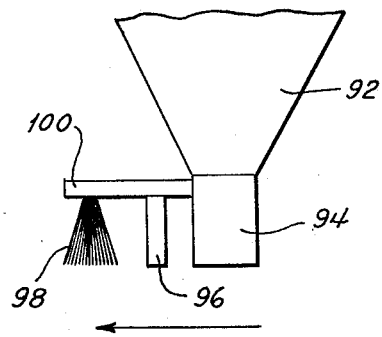
FIG. 10 is a side view of a magazine filling hopper.

The material filling hopper 92, see FIG. 9, is provided with a spout 94 which extends into the channel 90 so as to nearly fill the channel as shown but leaves a slight clearance on all sides. The filler blocks 46, 82 and 84 are preferably made of some slightly compressible material so that when they are in the aligned or filling position they fit tightly together and against the adjacent side walls of the containers 16 and completely span the space between the magazines so that as the magazines pass under the filling hopper 92 the spout 94 fills material into each magazine and as the channel 90 passes under the spout 94 it acts as a partial valve to momentarily cut off almost all of the flow of material from the spout until the next in line magazine moves under the spout. Any minor amout of material which is received in the channel 90 is swept therefrom first by a flexible apron, such as a sheet of rubber-like material, 96 and finally by a bristle brush 98 both carried by an arm 100 suitably supported as from the spout 94 as shown in FIG. 10. This minor amount of material is swept into the next approaching magazine thus leaving the channel 90 free and clear of any material.

As each closure 70 is moved by its roller 76 in co-operation with the cam bar 80 into position to tightly close the filling opening 20 and the side wall openings 22 as the magazine leaves the filling point, the movable filler blocks 82 and 84 are moved out of alignment with the fixed filler block 46 into the final positions shown in FIGS. 1, 5 and 6. This leaves a free and open space between adjacent magazines which is never less than the space 102 shown in FIG. 6 when the magazines are traveling in a straight line in any direction. This provides ample space for the magazines to close together while making a turn either horizontally or vertically and still not crush together and cause damage. The total length of the filler blocks 46, 82 and 84 combined is determined by the spacing between the magazines which is in turn determined by the radii of the turns on the endless conveyor. The tighter the turns the more space required between magazines and vice versa.

At points on the system where absolute stability of the magazines is required to prevent any undesired movement, such as at filling, unloading points and on vertical runs, it is preferable to use the two top conveyor tracks 104 which co-operate with the four wheels 106 on the trolleys 42 to maintain the magazines 14 in complete stability.

When the magazines 14 are large relative to the rate of flow of material from the feed chute 94, it is at times desirable to slow down the rate of travel of the supporting conveyor when a magazine is passing under the chute and then speed up the rate of travel of the supporting conveyor when the channel 90 is passing under the chute.

This can be accomplished in a number of well known ways, such, for example, as utilizing a two speed motor on the drive for the supporting conveyor and positioning a conventional electric switch at some appropriate point so as to be turned on while a magazine is passing under the chute and turned off while the filler blocks 46, 82 and 84 are passing under the chute. Such an appropriate point would be to the side of the series of magazines with its operating lever in position to contact the passing magazines at point A, see FIG. 4, so as to move it outwardly while it is in contact with a magazine and thus through well known electrical circuitry slow down the drive motor and let the switch lever move inwardly by its own spring pressure when a space between the magazines is passing and thus through the same circuitry speed up the drive motor. It being understood that the switch position will be selected so as to time the motor speed ups and slow downs with the periods when the chute 94 is over the filler blocks and magazines, respectively.

In addition to varying the speed of the supporting conveyor drive motor, or in lieu thereof, the aforementioned control switch can be utilized through well known electrical circuitry to operate a suitable valve in the chute 94 so as to close the chute when a space between magazines is passing under it and open the chute 94 when a magazine is passing under it.

When a very thorough cleaning of the magazines 14 is required, for example, when successive quantities of different high potency materials are to be conveyed and inter-contamination is to be completely avoided, a cleaning point in the path of travel of the magazines will be selected and opening cam bars 62 and 78 will be temporarily positioned at this point so as to open the filling and discharge opening closures at the same time as shown in FIG. 9. It being understood that the magazines will be empty at this time. A stream of air or water or other cleaning fluid can then be injected through the filling opening 20 to thoroughly clean each magazine as it passes and the cleaning agent can be suitably collected in a receptacle positioned beneath the discharge opening 18. After a reasonable drainage period the discharge closure 52 will again be closed by a closure cam bar 66 placed at some point ahead of the filling point in the path of travel of the magazines 14.

Although the magazines have been described above as being suspended from the supporting conveyor, it is to be understood that the magazines can with equal facility be supported to one side of or above the supporting conveyor.

The foregoing specification of what is now considered the preferred modification of the present invention is to be construed as descriptive and not limitative because many changes and modifications can be made in the above disclosed structure without departing from the spirit of the invention.

The invention having been described, what is claimed is:

1. A material handling system comprising a single track, a series of spaced apart trolleys carried by and movable along said track, linkages flexibly connected to and between successive trolleys to cause them to move together and to enable said trolleys to move freely around all turns made by the track regardless of the plane and direction in which the track turns, magazines for holding material carried for movement with said trolleys with clearance spaces therebetween, the minimum length of said clearance spaces between magazines of a given size and shape being controlled by the shortest radius of any track turn to enable the track to make turns in all directions without forcibly intercontacting any of said magazines, each of said magazines being provided with a filler opening, a movable closure for each of said openings, a filler means mounted adjacent the path of movement of said magazines for projecting material through said filler openings into said magazines, means for supplying material to said filler means, means for interrupting the flow of material from said filler means, and means synchronized with the movement of said magazines to open said movable closure before any filler opening moves under said filler means and to render said material flow interrupting means effective when any space between magazines is passing under said filler means.

2. A material handling system comprising a supporting conveyor unit of the overhead trolley type capable of making turns in all directions, material holding magazines carried by said supporting conveyor unit in a series with open spaces therebetween to enable the supporting conveyor unit to make turns in all directions without injury to said magazines due to jamming together on the turns, said magazines being provided with filler openings, filler means having an opening for projecting material through said filler openings into said magazines, a movable closure for each of said magazine filler openings, means for opening each of said movable closures before its filler opening moves under said filler means, and means carried for movement with each of said magazines for spanning the space between it and an adjacent magazine and in close proximity to said filler means opening to reduce the flow from said filler means at said open spaces and receive and retain such material as does flow from said filler means in the areas of said open spaces.

3. A material handling system as defined in claim 2 further characterized by a means for removing all material from said spanning means.

4. A material handling conveyor comprising a supporting conveyor unit, material receiving magazines carried by said supporting conveyor unit in a series with open spaces therebetween, said magazines being provided with filler openings, filler means for projecting material through said openings into said magazines, movable means for spanning the said spaces between adjacent magazines carried directly by said magazines for coextensive movement therewith, and means for moving said movable spanning means into position prior to arrival of each spanning means at said filler means so that all discharge from said filler means in the areas of said spaces will be received and retained by said spanning means.

5. A material handling conveyor as defined in claim 4 further characterized by means for removing all material from each spanning means, and means for moving each spanning means out of spanning position after leaving said filler means.

6. A material handling conveyor as defined in claim 4 further characterized by means for removing all material from said spanning means and depositing the material so removed into a magazine.

7. A material handling system comprising a supporting conveyor unit having a power drive, material holding magazines carried for movement by said supporting conveyor unit in a series with open spaces therebetween to enable the supporting conveyor to make turns in all directions without injury to the magazines due to jamming together on the turns, each of said magazines being provided with a filler opening in the form of an open channel extending completely along a side and through the ends of the magazine, filler means positioned to project into the channel and thus into the interior of each magazine in its path of travel to deliver material into the interior of each magazine, and means for activating said filler means to deliver material into each magazine whenever a filler opening channel is beneath said filler means and to cut off flow from said filler means whenever a space between magazines is beneath said filler means.

8. A material handling conveyor comprising a supporting conveyor unit, material receiving magazines carried for movement with said supporting conveyor unit in a series with open spaces therebetween to enable the supporting conveyor to make turns in all directions without injury to the magazines due to jamming together on the turns, said magazines being provided with filler openings, a movable closure for each magazine filler opening, filler means for projecting material through said openings into said magazines when the movable filler opening closures are in the open position, movable means for spanning the said spaces between adjacent magazines carried for movement with said magazines, and means for simultaneously moving said movable closure to open position and said movable spanning means into position prior to arrival of each spanning means at said filler means so that all discharge from said filler means in the areas of said open spaces will be received and retained by said spanning means.

9. A material handling conveyor comprising a supporting conveyor unit, material receiving magazines carried for movement with said supporting conveyor unit in a series with open spaces therebetween to enable the supporting conveyor unit to make turns in all directions without injury to the magazines due to jamming together on the turns, said magazines being provided with filler openings, a movable closure for each magazine filler opening, filler means for projecting material through said openings into said magazines when the closures are in open position, movable means for spanning the said spaces between adjacent magazines carried for movement with said magazines, and means for moving said movable closure to open position and said movable spanning means into position prior to arrival of each spanning means at said filler means so that said filler means can project material through each filler opening into each magazine and all discharge from said filler means in the areas of each open space between adjacent magazines will be received and retained by said spanning means.

10. A material handling system comprising a supporting conveyor unit, material holding magazines carried for movement with said supporting conveyor unit in a series with open spaces therebetween to enable the supporting conveyor to make turns in all directions without damage to the magazines due to jamming together on the turns, each of said magazines being provided with a filler opening in the form of an open channel extending completely along a side and through the ends of the magazine, a filler means projecting into said channel and thus into the interior of a magazine at a given point in its path of movement to deliver material into the magazine, means movable into and out of position for spanning the said spaces between magazines, and means for moving said movable spanning means into position prior to arrival of each spanning means at said filler means so that all discharge from said filler means in the areas of said open spaces will be received by said spanning means.

11. A material handling conveyor comprising a supporting conveyor unit, material receiving magazines carried for movement with said supporting conveyor unit in a series with open spaces therebetween to enable the supporting conveyor unit to make turns in all directions without damage to the magazines due to jamming together on the turns, said magazines being provided with filler openings, filler means for projecting material through said openings into said magazines, means movable into and out of position for spanning the said spaces between adjacent magazines carried for movement with said magazines, means for moving said movable spanning means into position prior to arrival of each spanning means at said filler means so that all discharge from said filler means in the areas of said open spaces will be received and retained by said spanning means, and means for moving said spanning means out of spanning position between adjacent magazines after said spanning means has passed said filler means and before reaching a curve in the path of movement of the magazines so that said spanning means can not interfere with relative movement between adjacent magazines while the magazines are making a turn.

12. A material handling conveyor as specified in claim 11 in which the movable spanning means comprises a channel formed in sections with part of the sections carried by a given magazine and the other part carried by the next adjacent magazine.

13. A material handling conveyor as specified in claim 11 in which the movable spanning means comprises a channel formed of fixed and movable sections with part of the sections carried by a given magazine and the other part carried by the next adjacent magazine.

14. A material handling conveyor as specified in claim 11 in which the movable spanning means comprises a channel formed of two movable and one fixed section with the fixed and one movable section carried by a given magazine and the other movable section carried by the next adjacent magazine.

15. A material handling conveyor comprising a supporting conveyor unit, material receiving magazines carried for movement with said supporting conveyor unit in a series with open spaces between adjacent magazines to enable the supporting conveyor unit to make turns in all directions without damage to the magazines due to jamming together on the turns, said magazines being provided with filler openings, filler means for projecting material through said filler openings into said magazines, means movable into and out of position for spanning each of said spaces between adjacent magazines carried for movement with said magazines, means for moving said movable spanning means into position prior to arrival of each spanning means at said filler means so that all discharge from said filler means in the areas of said open spaces will be received and retained by said spanning means, means for removing all material from each spanning means, and means for moving each of said spanning means out of spanning position between adjacent magazines after said spanning means has passed said filler means and before reaching a curve in the path of movement of said magazines so that said spanning means can not interfere with relative movement between adjacent magazines while the magazines are making a turn.

16. A material handling conveyor as specified in claim 15 in which the means for removing all material from each spanning means also deposits the material so removed into a magazine.

17. A material handling conveyor as specified in claim 16 in which the magazine into which the material removed from each spanning means is deposited in the magazine next following the said spanning means in the path of travel of the magazines.

18. A material handling conveyor as specified in claim 17 in which the movable spanning means comprises a channel formed of two movable and one fixed section with the fixed and one movable section carried by a given magazine and the other movable section carried by the next adjacent magazine.

19. A material handling conveyor as specified in claim 18 in which each magazine includes a discharge opening and a movable closure for said discharge opening.

References Cited by the Examiner

UNITED STATES PATENTS 675,657   6/1901   Hoshor _____ 198—63

EVON C. BLUNK, *Primary Examiner.*

EDWARD A. SROKA, *Examiner.*